(12) United States Patent
Gottfried

(10) Patent No.: US 11,788,499 B2
(45) Date of Patent: Oct. 17, 2023

(54) UNINTERRUPTIBLE POWER SUPPLY SYSTEM WITH ENGINE START-UP

(71) Applicant: Potencia Industrial LLC, Laredo, TX (US)

(72) Inventor: Tomas Gottfried, Mexico City (MX)

( * ) Notice: Subject to any disclaimer, the term of this patent is extended or adjusted under 35 U.S.C. 154(b) by 0 days.

(21) Appl. No.: 16/926,912

(22) Filed: Jul. 13, 2020

(65) Prior Publication Data

US 2021/0324825 A1 Oct. 21, 2021

Related U.S. Application Data

(63) Continuation-in-part of application No. 16/353,744, filed on Mar. 14, 2019, which is a continuation-in-part of application No. 15/811,104, filed on Nov. 13, 2017, now abandoned.

(51) Int. Cl.

| | |
|---|---|
| *F02N 11/08* | (2006.01) |
| *H02K 7/00* | (2006.01) |
| *H02K 7/18* | (2006.01) |
| *F02N 11/04* | (2006.01) |
| *H02K 7/02* | (2006.01) |

(52) U.S. Cl.
CPC .......... *F02N 11/0862* (2013.01); *F02N 11/04* (2013.01); *F02N 11/087* (2013.01); *H02K 7/003* (2013.01); *H02K 7/02* (2013.01); *H02K 7/1815* (2013.01)

(58) Field of Classification Search
CPC ........ F02N 11/04; F02N 11/087; F16F 15/30; H02K 11/042; H02K 11/28; H02K 16/00; H02K 19/365; H02K 19/38; H02K 7/02; H02K 7/14; H02K 7/1815; H02K 7/20
See application file for complete search history.

(56) References Cited

U.S. PATENT DOCUMENTS

| | | | |
|---|---|---|---|
| 2,688,704 A | 9/1954 | Christenson | |
| 3,221,172 A | 11/1965 | Rolison | |
| 3,305,762 A | 2/1967 | Geib, Jr. | |
| 3,458,710 A | 7/1969 | Dodge | |
| 3,810,116 A | 5/1974 | Prohofsky | |
| 4,406,950 A * | 9/1983 | Roesel, Jr. ..... | H02J 9/066 290/4 C |

(Continued)

*Primary Examiner* — Tulsidas C Patel
*Assistant Examiner* — S. Mikailoff
(74) *Attorney, Agent, or Firm* — Egbert, McDaniel & Swartz, PLLC

(57) ABSTRACT

An uninterruptible power supply system has a regulated power source, an electrical generator electrically interconnected to the regulated power source, an engine having a main shaft integral with or coupled to the shaft of the electrical generator, a rotating rectifier mounted onto a shaft of the electrical generator, a mains power supply, a switch connected between the electrical generator, the mains power supply and a synchronous machine of the regulated power source, a synchronous generator, and an uninterruptible load. The regulated power source has a housing, a synchronous machine, a synchronous generator, and a flywheel sharing a common shaft. The electrical generator has a shaft coupled to a combustion engine. The switch transfers power from the synchronous machine to the electrical generator to cause the electrical generator to rotate its shaft or the main shaft of the engine. A short-stop load is supplied power from the electrical generator.

7 Claims, 4 Drawing Sheets

(56) References Cited

U.S. PATENT DOCUMENTS

| | | | |
|---|---|---|---|
| 4,460,834 A * | 7/1984 | Gottfried | H02J 9/066 |
| | | | 307/64 |
| 4,686,375 A | 8/1987 | Gottfried | |
| 5,053,635 A | 10/1991 | West | |
| 5,646,458 A | 7/1997 | Bowyer | |
| 5,767,591 A | 6/1998 | Pinkerton | |
| 5,811,960 A | 9/1998 | Van Sickle et al. | |
| 6,198,176 B1 * | 3/2001 | Gillette | H02J 9/08 |
| | | | 307/64 |
| 8,227,938 B2 | 7/2012 | Gottfried | |
| 9,577,471 B2 * | 2/2017 | Gottfried | H02J 9/066 |
| 2005/0173925 A1 * | 8/2005 | Farkas | F01K 13/00 |
| | | | 290/1 A |
| 2015/0229162 A1 * | 8/2015 | Gottfried | H02J 9/066 |
| | | | 307/65 |
| 2020/0153311 A1 * | 5/2020 | Gottfried | H02K 11/042 |

\* cited by examiner

UNINTERRUPTIBLE POWER SUPPLY SYSTEM WITH ENGINE START-UP

CROSS-REFERENCE TO RELATED APPLICATIONS

The present application is a continuation-in-part of U.S. patent application Ser. No. 16/353,744, filed on Mar. 14, 2019, and entitled "Power Supply System and System for Providing Start-Up of Engines Used in such Power Supply System", presently pending. U.S. patent application Ser. No. 16/353,744 is a continuation-in-part of U.S. patent application Ser. No. 15/811,104, filed on Nov. 13, 2017, and entitled "Power Supply System and System for Providing Start-Up of Engines Used in such Power Supply System", now abandoned.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to power supply systems. More particularly, the present invention relates to uninterruptible power supply systems that utilize an internal combustion engine for supplying power during periods of power interruption. More particularly, the present invention relates to power supply systems using flywheel machines for causing an internal combustion engine of the power supply system to startup.

2. Description of Related Art Including Information Disclosed Under 37 CFR 1.97 and 37 CFR 1.98

It is customary in situations of critical electrical power requirements to provide an auxiliary power source which can be switched to and from the load in the event of commercial power failure or excessive power variations. For example, during the countdown period prior to launch of a space vehicle, it is very important that the power supplying the load to the various computers and data equipment be reliable. Typically, computer systems require a constant power supply which can be eventually aided by a combustion engine power supply. Interruptions in the power supply can erase memory and injure the software and hardware of the computer. Other situations where reliable power supplies are considered important include: automatic banking services, automatic industrial processes, communication and signaling centers for maritime and aerial transportation, radio and television stations, and various emergency and security services. Typical uninterruptible power supply systems depend on combustion engines to resume power in such systems.

Commercial power alone is generally not considered sufficiently reliable as a sole source of power for such usages. Interruptions commonly occur and loads may vary as other users come on and off the commercial power line. These problems are enhanced in the lesser developed grid systems are only in the initial stage of development.

Uninterruptible power systems are generally known within the prior art. Such uninterruptible power supplies usually comprise a generator (that feeds the critical load) and two prime movers, one of which normally drives the generator, and the other normally being stationary. The generator can be a power electronic inverter or an electromagnetic machine, depending on the type of uninterruptible system that is used. When the normally operating prime mover ceases to function for any reason, the normally stationary prime mover is brought up to speed and is connected to drive the generator, usually through a clutch or a battery system (that delivers power during transitions), thereby ensuring a continuous supply of current from the generator. Commonly, a kinetic energy supply and device (such as a flywheel or a D.C. dynamoelectric machine) is coupled to the generator and supplies energy thereto during the transitional period when the generator load is being transferred from one prime mover to the other. Also, a battery bank can supply stored energy to the generator during transitional periods. One prior art type of no-break power supply comprises an internal combustion engine adapted to be connected through a normally disengaged clutch to a flywheel, the flywheel being connected in turn to the rotor of an electric generator which in turn is connected to the rotor of an AC motor. Another prior art type of no-break power supply employs a DC dynamoelectric machine in place of the flywheel, both of these devices acting to supply kinetic energy during the aforementioned transitional period.

In the operation of a prior art no-break power supply of either of the aforementioned types, the generator and kinetic energy supplying device are normally driven by the AC motor. When there is a failure or an interruption in the power supplied to the AC motor, the internal combustion engine is started automatically, brought up to speed, and the clutch is then engaged. The internal combustion engine then drives the generator. During the transitional period when the load is being shifted from one prime mover to the other, the kinetic energy of the flywheel or DC machine is utilized to maintain the rotation of the generator.

The prior art shows the number of patented devices that supply uninterruptible power to an external load. U.S. Pat. No. 2,688,704 describes a motor-generator-engine assemblage arranged so as to provide a constant source of electrical power. This device employs a clutch as the switching arrangement. U.S. Pat. No. 3,221,172 is a no-break power supply employing a differential between the primary motor and the standby motor. U.S. Pat. No. 3,305,762 discloses an improved method for maintaining the supply of electrical energy to a load during an interruption of the normal supply of electrical power. This device employs a clutch of the eddy current type. U.S. Pat. No. 3,458,710 is an emergency power system providing an uninterrupted power source having an electric generator for supplying energy to a load, a first motor adapted to be connected to a source of power external as a power system, and a second motor for driving the generator. This system also provides an auxiliary generator driven by a diesel engine for supplying the second motor through a relay connection. U.S. Pat. No. 3,810,116 relates to systems for capturing the information stored in a volatile semiconductor memory during the loss of electric power.

Typically, these prior art uninterruptible power supplies have a number of disadvantages. In certain devices, the clutch or differential is a weak mechanical link in the system and from time to time requires replacement. Generally speaking, the internal combustion engine, clutch, flywheel, generator, and AC motor must be mounted in end-to-end relationship with their respective shafts coupled together. This creates a power supply of considerable physical length which can be difficult to install in a small area. Auxiliary controls must be provided to start the internal combustion engine, to bring it up to speed, and to engage the generator at the proper time. Many of the prior art devices do not operate as load isolators from the power line during normal operations. As a result, fluctuations in electrical power, such as brownouts, would continue to affect the external load.

In order to overcome these problems associated with the prior art, the present applicant developed uninterruptible power systems that are the subject of several patents. For example, U.S. Pat. No. 4,460,834, issued on Jul. 17, 1984 to Carlos F. Gottfried, describes an uninterruptible power system for providing an uninterruptible power supply to an external load. The power system includes a flywheel generator, a first motor, a standby generator, and a transfer controller. The flywheel generator is adapted to supply power to the external load. The first motor is drivingly connected to the flywheel generator. The first motor is adapted to be connected to a source of power external to the power system. The standby generator is electrically connected to the first motor. A standby motor is drivingly connected to the standby generator. The transfer controller is adapted to switchably interconnect the first motor to the source of power and to interconnect the standby generator to the first motor.

U.S. Pat. No. 4,686,375, issued on Aug. 11, 1987 also to Carlos F. Gottfried, shows an uninterruptible power supply co-generation system which includes a first generator connected to a primary external load, a second generator connected to a secondary external load, and a prime mover connected to the first and second generators by a common shaft. The first generator is electrically isolated from the secondary external load. The prime mover is an internal combustion engine that supplies rotational movement to the common shaft. The secondary external load is the electrical utility. A thermal recovery system is connected to the internal combustion engine.

U.S. Pat. No. 8,227,938, issued on Jul. 24, 2012 also to Carlos F. Gottfried, discloses a batteryless starter for an uninterruptible power system. This uninterruptible power system includes a motor generator for conditioning electric power, a backup generator having an internal combustion engine having an electrically-driven starter so as to provide backup electric power, an electrical switch that is electrically connected to power mains and to the electrical output of the backup generator and to the electrical input of the motor generator for selectively switching power from the power means and the backup generator to the motor generator. The starter switch is electrically connected to the output of the motor generator and electrically connected to the input of the starter system for switchably connecting the output of the motor generator to the starter.

A variety of other patents have also issued relating to such uninterruptible power systems that address certain problems found in the prior art. For example, U.S. Pat. No. 5,053,635, issued on Oct. 1, 1991 to G. West, provides an uninterruptible power supply with a variable speed drive which drives a synchronous motor/generator. The synchronous motor/generator and the variable speed drive are connected to inductively accelerate the motor/generator to near synchronous speed. When the motor/generator assembly reaches near synchronous speed, the motor/generator is switched to synchronous operation, while still under control of the variable speed drive. The variable speed drive is connected to maintain synchronicity with the motor/generator during acceleration.

U.S. Pat. No. 5,646,458, issued on Jul. 8, 1997 to Bowyer et al., provides an uninterruptible power supply that provides conditioned AC power to a critical load. This uninterruptible power system includes a variable speed drive that operates in response to AC utility power or to a standby DC input by providing a motor drive signal. The uninterruptible power supply power conditioning unit further includes a motor-generator that operates in response to the motor drive output by providing the conditioned AC power to the critical load. In response to an outage in the utility AC power, standby DC power is provided by a standby DC power source that includes a variable speed drive and a flywheel motor-generator connected to the variable speed drive. Both the power conditioning unit and the standby DC power source are initially operated in response to the utility AC power. The flywheel motor-generator stores kinetic energy in a rotating flywheel. When an outage occurs, the rotating flywheel continues to operate the flywheel motor-generator of the standby DC power source so as to cause the production of AC power which is rectified and provided as standby DC power to operate the variable speed drive of the power conditioning unit until either the utility AC power outage is over or a standby emergency generator is brought on line.

U.S. Pat. No. 5,767,591, issued on Jun. 16, 1998 to J. F. Pinkerton, discloses a method and apparatus for providing startup power to a genset-backed uninterruptible power supply. In this apparatus, the flywheel energy storage device produces three-phase AC voltage and is used to provide temporary power to a critical load while a backup power supply, such as a diesel generator set, is accelerated to full speed. The startup power for the genset is also provided from the flywheel energy storage device through a circuit that converts the AC voltage at one level to DC voltage at a lower level.

U.S. Pat. No. 5,811,960, issued on Sep. 22, 1998 to Van Sickle et al., teaches a batteryless uninterruptible power supply. This power supply converts mechanical rotation generated by a local power source to electrical power in the event of commercial line power distortion or failure. The uninterruptible power supply uses a voltage and frequency-tolerant rectifier-inverter combination that converts the decaying output of a de-accelerating synchronous alternating current machine to a stable alternating current voltage for driving a critical load.

U.S. Pat. No. 9,577,471, issued on Feb. 21, 2017 to Carlos F. Gottfried, discloses a power supply system for providing a uninterruptible power supply to an external load. This power system has a first motor adapted to be connected to a source of power, a flywheel/generator adapted to supply power to the external load, a standby generator switchably electrically connected to the flywheel/generator, and a second motor drivingly connected to the generator/motor and to the internal combustion engine. The second motor is electrically connected to the power supplied by the flywheel/generator. The first motor is drivingly connected to the flywheel/generator. The flywheel/generator is electrically isolated from the source of power. The standby generator has an internal combustion engine that is drivingly connected to a generator/motor. The generator/motor is adapted to supply power to the flywheel/generator or to the external load upon a change in power supplied by the flywheel/generator or the source of power.

A problem associated with these prior art mechanisms is that they all require a direct-current starter-motor for starting the engine. Hence, engine startup depends on many components that require proper functioning in order for successful startup to occur. Therefore, proper startup becomes less likely to occur.

Another problem associated with these prior art mechanisms is the amount of delay involved in bringing the internal combustion engine up to a synchronous speed for the production of power. In most circumstances where an internal combustion engine is used or, in particular, a diesel engine is used, a starter is required in order to charge a flywheel to begin the operation of the engine. The starter is typically powered by DC power. As such, there is a delay ranging any where from three to one hundred and twenty seconds in achieving full speed in order to achieve power production from the engine. As such, a need has developed so as to provide a system whereby the internal combustion engine can be accelerated more quickly and brought up to synchronous speed in a rapid manner.

A further problem associated with these prior art mechanisms is that their energy consumption is considerable because of their low energy efficiency during operation. This is true especially in the case of induction motors since the electric current in their rotors which can have high energy losses. Induction motors also tend to cause greater energy losses in the electric grid that they are connected to because of the lower power factor caused by such induction motor. The induction motor causes greater currents in the systems and results in a lower energy efficiency of the entire installation.

Another problem associated with these prior art mechanisms is that their role on the normal power on the mains power supply is as an inductive load. This can reduce the power factor in the grid. As a result, there will be reduced voltage stability in such grid.

Engine starters are somewhat notorious for unreliable operation. As such, whenever the ability to start the internal combustion engine is dependent upon a starter, users of the uninterruptible power supply system are often concerned that if there were a failure of the starter, the backup generator would not be effective in maintaining the uninterruptible load. As such, a redundant system is felt to be desirable so as to assure that internal combustion engine is always operable, even in the event of starter failure.

It is an object of the present invention to provide a power supply system that supplies uninterruptible power and increases the reliability of such uninterruptible power by increasing the reliability of successful startup of the combustion engine and does not rely on any other engine cranking startup methods.

It is an object of the present invention provide a power supply system that provides cranking torque to the engine during engine startup, starting from zero revolutions per minute RPMs and at least until internal combustion is achieved, but also is capable of providing further acceleration after initial combustion is achieved.

It is in another object of the present invention to provide a faster way of accelerating an engine to full speed.

It is another object of the present invention to provide a power supply system that has minimal controls and electronics.

It is another object of the present invention to provide a power supply system that avoids failures.

It is a further object of the present invention to provide a power supply system that includes a minimal number of moving parts.

It is a further object of the present invention to provide a power supply system that avoids the use of batteries.

It is still another object of the present invention to provide a power supply system that inherently avoids engine overspeed.

It is another object of the present invention to provide a power supply system that operates at a higher energy efficiency.

It is still a further object of the present invention to provide a power supply system that provides voltage and frequency regulation to the mains power supply grid.

It is still another object of the present invention to provide a power supply system that provides power-factor correction services to the mains power supply grid.

It is still further object of the present invention to provide voltage and frequency regulation when connected to a short-stop load grid.

It is still another object of the present invention to provide a power supply system that provides power-factor correction services when connected to a short-stop load grid.

It is still another object of the present invention to provide an uninterruptible power source that is electrically isolated from other sources and creates an independent electric power grid that has robust voltage stability.

These and other objects and advantages of the present invention will become apparent from a reading of the attached specification and appended claims.

BRIEF SUMMARY OF THE INVENTION

The present invention is a power supply system that has a regulated power source, an electrical generator electrically interconnected to the regulated power source, an engine having a main shaft integral with or coupled to a shaft of the electrical generator, a mains power supply, a switch connected between the electrical generator and the mains power supply and the synchronous machine of the regulated power source, and a load. The regulated power source has a housing, a synchronous machine, a synchronous generator, and a flywheel that shares the common shaft with rotating components of the synchronous machine and synchronous generator within the housing. The engine has a main shaft therein that is integral with or coupled to the shaft of the electrical generator. The switch is adapted to transfer power from the synchronous machine of the regulated power source to the electrical generator so as to cause the electrical generator to rotate the shaft thereof in order to rotate the main shaft of the engine or to supply power from the engine to the regulated power source. The synchronous generator of the regulated power source supplies uninterruptible power to the uninterruptible load independent of the power supplied by the electrical generator or the synchronous machine of the regulated power source.

The synchronous generator of the regulated power source supplies uninterruptible power to the uninterruptible load. The synchronous generator, in particular, is an independent electrical circuit from any other electrical circuits and supplies power to the uninterruptible load free from switching and free from interruptions which may occur on the electrical circuit of the mains power supply. The synchronous machine drives the common shaft of the regulated power source. The synchronous machine of the regulated power source has a power line that is connected to the switch.

The synchronous machine of the present invention includes an excitation stator winding, an excitation rotor winding cooperative with the excitation stator winding, a main stator winding, a main rotor winding cooperative with the main stator winding, and a squirrel cage winding cooperative with the main stator winding and with the main rotor winding. The excitation rotor winding, the main rotor winding, and the squirrel cage winding all rotate with a rotation of the common shaft of the regulated power source. A voltage controller is electrically connected to the excitation stator winding so as to cause a voltage to develop in the main rotor winding and main stator winding so that power flows out of the regulated power source as the common shaft and the flywheel rotate. A rotating rectifier is affixed to the shaft of the regulated power source. This rotating rectifier is cooperative with the excitation rotor winding and with the main rotor winding.

The synchronous machine of the regulated power source is switchable and electrically connected to the mains power supply so as to supply power from the mains power supply to the regulated power source. The switch electrically connects the synchronous machine of the regulated power source to the mains power supply or electrically connects the electrical generator to the synchronous machine of the regulated power source so as to supply power from the regulated power source to the electrical generator during engine startup or from the electrical generator to the regulated power source after engine startup.

The electrical generator comprises a main stator winding, a main rotor winding mounted to the shaft of the electrical generator, a squirrel cage winding cooperative with the main stator winding and the main rotor winding, an excitation stator winding, and an excitation rotor winding cooperative with the shaft of the electrical generator and cooperative with the excitation stator winding. The electrical generator further comprises a rotating rectifier affixed to the shaft and electrically connected to the excitation rotor winding and to the main rotor winding. The electrical generator further comprises an automatic voltage regulator electrically connected to the excitation stator winding so as to monitor and control voltage of the main stator of the electrical generator.

The switch has an incoming power switch and an outgoing power switch with an interlock that prevents both of the incoming and outgoing power switches from being in a closed position at the same time. The incoming power switch is in a closed position so as to supply power from the mains power supply to the synchronous machine of the regulated power source. The incoming power switch is in an open position so as to disconnect the mains power supply from the regulated power source and allows the outgoing power switch to be in a closed position. The outgoing power switch is in a closed position so as to supply power from the synchronous machine of the regulated power source to the electrical generator or from the electrical generator to the synchronous machine of the regulated power source. The outgoing power switch is in an open position so that the electrical generator is disconnected from the regulated power source and allows the incoming power switch to be in the closed position so that the mains power supply supplies power to synchronous machine of the regulated power source. The incoming power switch is in the closed position and the outgoing power switch is in the open position so as to supply power from the mains power supply to the regulated power source. The incoming power switch is in the open position and the outgoing power switch is in the closed position so that power flows from the regulated power source to the electrical generator or from the electrical generator to the regulated power source.

The engine is an internal combustion engine. The mains power supply is a three-phase alternating-current (AC) power supply. The electrical generator acts as an induction motor when the switch causes power to flow from the regulated power source to the electrical generator. The induction motor is cooperative with the main shaft of the engine so as to cause the main shaft of the engine to rotate during engine startup.

The present invention is also a system for starting an engine. The system includes a regulated power source, an electrical generator electrically connected or interconnected to the regulated power source, a mains power supply, and a switch connected between the electrical generator and the regulated power source. The regulated power source has a housing, a synchronous machine, a flywheel mounted on a common shaft, and a synchronous generator. The synchronous machine and the synchronous generator share the common shaft with the flywheel. The synchronous machine, the flywheel and the synchronous generator are located within the housing. The electrical generator is electrically connected or interconnected to the synchronous machine of the regulated power source. The electrical generator has a shaft therein. The shaft of the electrical generator is adapted to be coupled to or integral with the main shaft of the engine. The switch is connected between electrical generator and the mains power supply and the synchronous machine of the regulated power source. The switch causes power to flow from the synchronous machine of the regulated power source to the electrical generator when startup of the engine is required so as to cause the electrical generator to act as an induction motor. The induction motor rotates the shaft of the electrical generator so as to start a rotation of the main shaft of the engine. The induction motor acts as a load that receives power from the synchronous machine of the regulated power source during engine startup. An uninterruptible load receives uninterruptible power from the synchronous generator of the regulated power source in an independent electrical circuit. After engine startup, the electrical generator stops acting as an induction motor and acts as an electrical generator that may then supply power to the synchronous machine of the regulated power source. After startup, a short-stop load can receive power directly from the electrical generator. After engine startup, the synchronous machine of the regulated power source will also be connected to this short-stop load in order to provide voltage and frequency stabilization and power factor correction services to this short-stop load.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
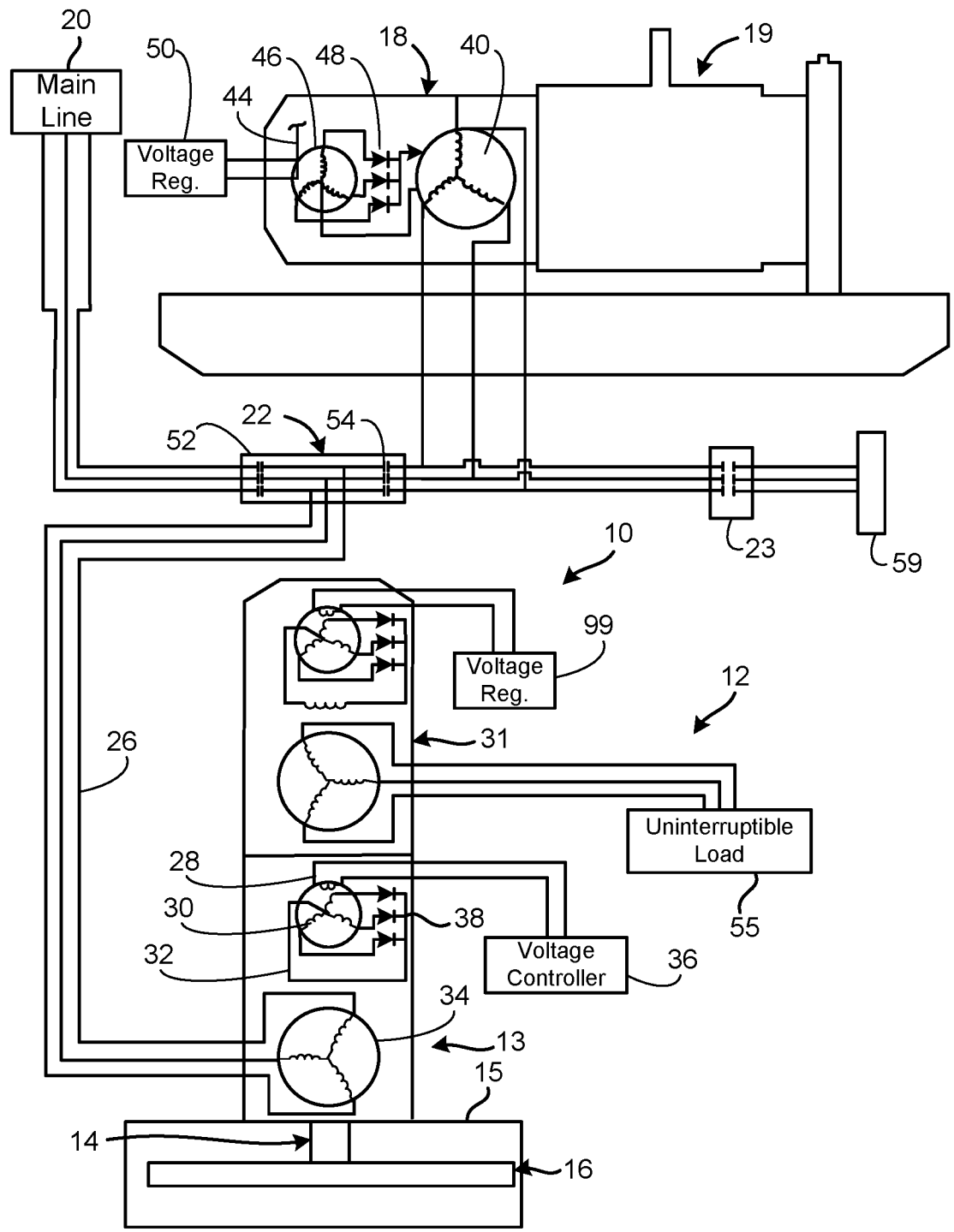
FIG. 1 is a diagrammatic illustration of the power supply system of the present invention.

Referring to FIG. 1, there is shown the power supply system 10 in accordance with the preferred embodiment of the present invention. The power supply system 10 includes a regulated power source 12 having a synchronous machine 13, a synchronous generator 31 and a flywheel 16 with a common shaft 14 in a housing 15. An electrical generator 18 is coupled to an engine 19 and is electrically connected to the regulated power source 12 by a switch 22. The switch 22 is connected between the electrical generator 18, the mains power supply 20 and the regulated power source 12. The switch 22 transfers power from the regulated power source 12 to the electrical generator 18 so as to cause the electrical generator 18 to rotate a shaft of the electrical generator 18 in order to correspondingly rotate the main shaft of the engine 19, during startup of the engine 19 and supplies power from the engine 19 and electrical generator 18 to the regulated power source 12 after engine startup.

In FIG. 1, the regulated power source 12 includes a synchronous machine 13 that may act as an induction motor, a synchronous motor and a synchronous condenser, or a synchronous generator with the common shaft 14. The synchronous machine 13 can act as a synchronous condenser. The regulated power source 12 has an incoming/outgoing power line 26 connected from the synchronous machine 13 of the regulated power source 12 to the switch 22.

Figure 3:
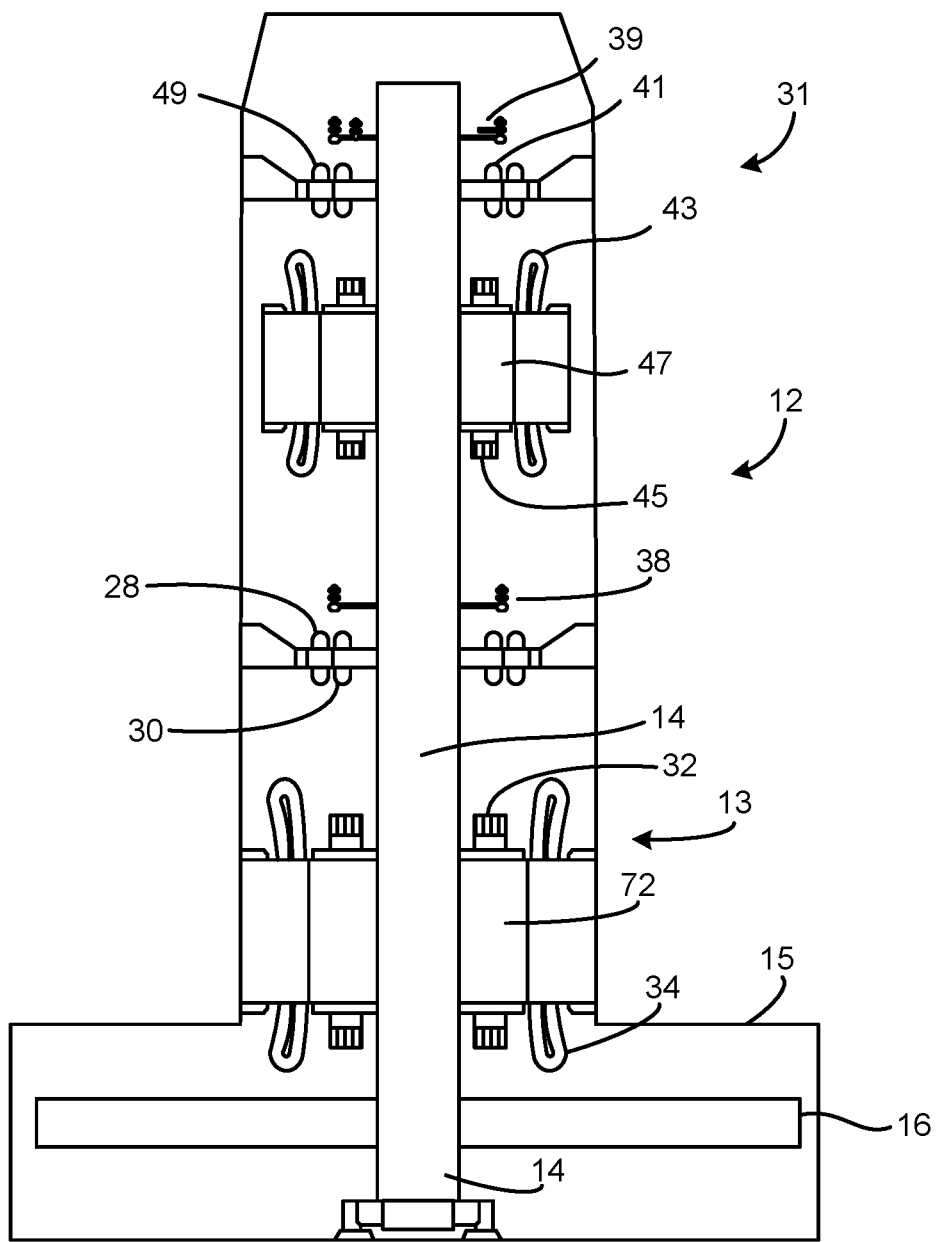
FIG. 3 is a cross-sectional view of the regulated power source of the present invention.

The synchronous machine 13 of the regulated power source 12 includes an excitation stator winding 28, an excitation rotor winding 30, a main rotor winding 32, a squirrel cage winding 72 (as shown in FIG. 3 and not shown in FIG. 1 since it would overlap with the main rotor winding 32), and a main stator winding 34. A voltage controller 36 is electrically connected to main stator winding 34 for monitoring the voltage of main stator winding 34 and electrically connected to deliver power to the excitation stator winding 28 so as to cause a voltage to develop in the main stator winding 34 during startup of the engine 19 so that power flows out of the regulated power source 12 as the flywheel 16 rotates the common shaft 14 or to regulate reactive power generation for power factor correction when the regulated power source 12 is connected to the mains power supply 20. A rotating rectifier 38 (also shown in FIG. 3) is affixed to the common shaft 14 of the regulated power source 12. The rotating rectifier 38 is cooperative with the excitation rotor winding 30, the main rotor winding 32, the voltage controller 36, and the main stator winding 34. The regulated power source 12 can be switchably electrically connected to the electrical generator 18 so as to supply or receive power to or from the electrical generator 18. The switch 22 electrically connects the synchronous machine 13 of the regulated power source 12 to the mains power supply 20 to maintain synchronous speed and act as a synchronous condenser for the mains power supply 20, or electrically connects the synchronous machine 13 of the regulated power source 12 to the electrical generator 18, (which will act as a load during startup of engine 19) when the regulated power source 12 supplies power from the regulated power source 12 to the electrical generator 18. After startup of engine 19, the electrical generator 18 will supply power to the synchronous machine 13 of the regulated power source 12.

Figure 2:
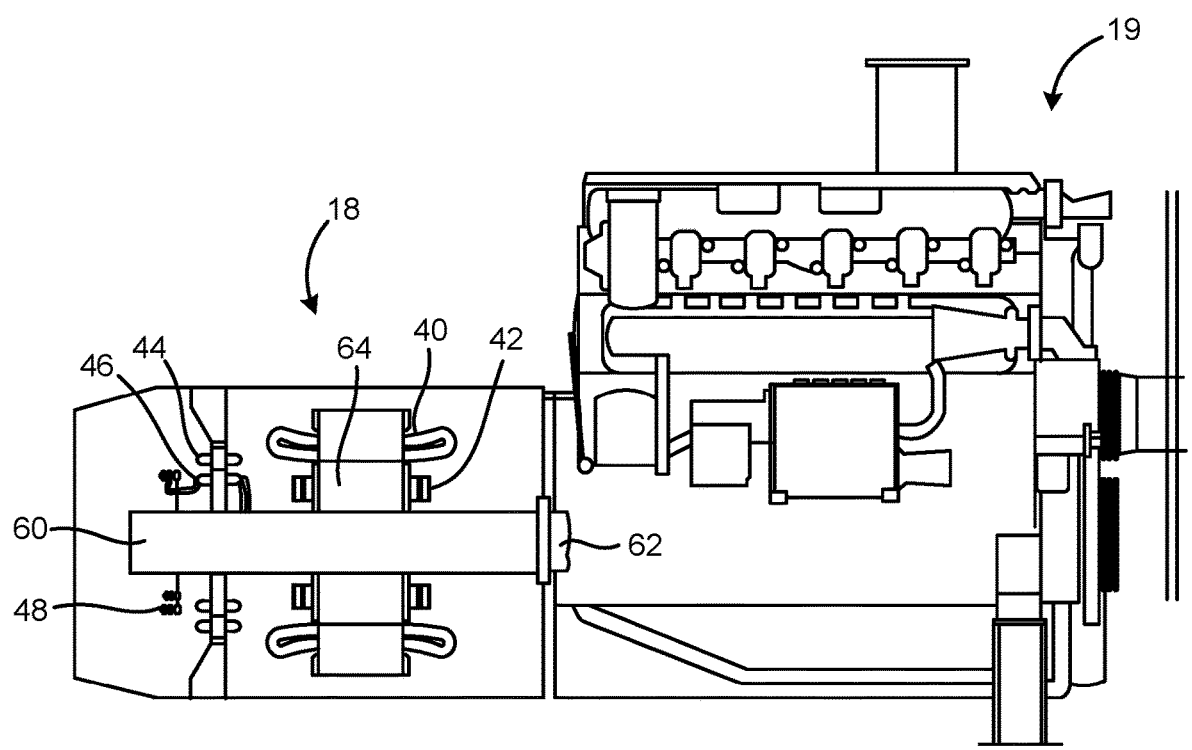
FIG. 2 is a cross-sectional view showing the electrical generator and engine of the power supply system of the present invention.

As shown in FIG. 2, the electrical generator 18 includes a main stator winding 40, a main rotor winding 42, a squirrel cage winding 64 an excitation stator winding 44 and an excitation rotor winding 46. The main rotor winding 42, the squirrel cage winding 64, and the excitation rotor winding 46 are cooperative with the shaft 60 (as shown in FIG. 2) so as to rotate the shaft 60 of the electrical generator 18. A rotating rectifier 48 is mounted on the shaft 60 of the electrical generator 18 and electrically connected to the excitation rotor winding 46 and to the main rotor winding 42. An automatic voltage regulator 50 (shown in FIG. 1) is electrically connected to main stator winding 40 for monitoring the voltage of main stator winding 40, and electrically connected to deliver power to the excitation stator winding 44 so as to monitor and control voltage of the main stator winding 40 of the electrical generator 18.

FIG. 1 shows that the regulated power source 12 includes a synchronous generator 31 whose rotor is mounted to the common shaft 14 and whose stator is mounted on the housing 15 of the regulated power source 12. The flywheel 16 is mounted on the common shaft 14. As such, as the common shaft 14 rotates with the rotation of the flywheel 16, this rotation causes the synchronous generator 31 to produce electric power which can be delivered to the uninterruptible load 55 in a completely independent electrical circuit. Synchronous generator 31 is a complete synchronous generator including independent excitation and voltage regulator 99. As such, uninterruptible load 55 will receive electrical energy from the synchronous generator 31 of the regulated power source 12. This creates an electrical power circuit that is electrically isolated from the mains power line 20, electrical generator 18 and synchronous machine 13 of the regulated power source 12. The configuration of the synchronous generator 31 is similar to the configuration of the electrical generator 18 (described hereinbefore), and is designed specifically to create an isolated grid with robust voltage stability.

The switch 22 has an incoming power switch 52 and an outgoing power switch 54. There is an interlock that allows for only one of the switches to be closed at any given moment. The incoming power switch 52 is in a closed position so as to supply power from the mains power supply 20 to the regulated power source 12. The incoming power switch 52 is in an open position so as to disconnect the mains power supply 20 from the regulated power source 12 and to allow the outgoing power switch 54 to close. The outgoing power switch 54 is in a closed position so as to supply or receive power between the regulated power source 12 and the electrical generator 18. The outgoing power switch 54 is in an open position so that the electrical generator 18 is disconnected from the regulated power source 12 and allows for the incoming power switch 52 to close.

The incoming power switch 52 is in a closed position and the outgoing power switch 54 is in an open position so as to supply power from the mains power supply 20 to the regulated power source 12. The incoming power switch 52 is in the open position and the outgoing power switch 54 is in the closed position so that power flows to and from the regulated power source 12 and the electrical generator 18.

In the present invention, the engine 19 is an internal combustion engine. The mains power supply 20 is a three-phase AC power supply. The electrical generator 18 is a synchronous generator enabled to act as an induction motor when the switch 22 causes power to flow from the regulated power source 12 to the electrical generator 18 during startup of the engine 19. When this electrical generator 18 acts as an induction motor, the induction motor is cooperative with the main shaft 62 of the engine so as to cause the main shaft 62 of the engine to rotate.

The power supply system 10 works as follows. Initially, the regulated power source 12 is accelerated by the synchronous machine 13 acting as a synchronous motor so as to remain at its full nominal speed (which is also at synchronous speed). This occurs by being connected to the switch 22 to the mains power supply 20. The uninterruptible load 55 receives power from the synchronous generator 31 of the regulated power source.

When it is connected to the mains power supply 20, the synchronous machine 13 of the regulated power source 12 acts as a synchronous condenser so as to provide kilo volt-amperes reactive (KVARs) in order to improve power factor. This increases the efficiency of the power supply system 10 and the mains power supply 20, and improves voltage stability on the mains power supply 20. The regulated power source 12 also acts to increase frequency stability in the mains power supply 20 because of the inertia of the flywheel (which rotates at a constant frequency).

When a fault is detected on the mains power supply 20, the power supply system 10 will command the engine 19 to start. Engine 19 startup will commence by opening the incoming power switch 52. Simultaneously, the voltage controller 36 will halt excitation to the synchronous machine 13 of the regulated power source 12. Then, the outgoing power switch 54 will be closed. Because the excitation is off, this will permit for a low transient when closing the outgoing power switch 54. As a result, the power supply system 10 will not experience any electrical or mechanical power conditions that are damaging to the components. After closing the outgoing power switch 54, the synchronous machine 13 of the regulated power source 12 will connect to the electrical generator 18. Voltage controller 36 will now operate to create a voltage in the main stator winding 34 of the synchronous machine 13 of the regulated power source 12.

Because the synchronous machine 13 of the regulated power source 12 is not connected to any incoming external power source, and because it is spinning, the and because it has excitation from voltage controller 36, the synchronous machine 13 of the regulated power source 12 will now act as a synchronous generator that delivers the accumulated kinetic energy in the flywheel 16 to drive the electrical generator 18 as an induction motor. It will do this by means of the voltage controller 36 so as to deliver power to the excitation stator winding 28. This causes a voltage to be developed in the leads of the main stator winding 34. Therefore, power will flow out from the synchronous machine 13 of the regulated power source 12.

When this occurs, the electrical generator 18 will act as an induction motor because the electrical generator 18 is at a stand-still, and because its rotor has a squirrel cage winding 64, and because it can be fed electrical power to the leads of the main stator winding 40, the electrical generator 18 will act as an induction motor. As such, it develops higher torque as voltage originating in the synchronous machine 13 of the regulated power source 12 is increased. During this phase, the leads of the main rotor winding 42 will be connected to each other in short-circuit by way of the rotating rectifier 48 (to be described hereinafter). This allows for even further torque to be developed. This torque will cause the shaft 60 of the electrical generator 18 to turn. As such, the main shaft 62 of the engine 19, which is coupled to the shaft 60 of the electrical generator 18, will also turn. The main shaft 62 of the engine 19 will continue to accelerate as it turns. It will eventually meet the required turning conditions of the main shaft 62 of the engine 19 so as to allow for combustion to occur in the engine 19.

At this point in time, regulated power source 12 remains engaged and assists in the acceleration of the engine 19 and thus the time to bring the engine 19 to full speed is reduced. The voltage controller 36 will regulate the power required at each stage of the acceleration so as to optimize this operation as well as to protect the components from power conditions that might damage any of the components. As the synchronous machine 13 of the regulated power source 12 remains engaged during acceleration, it will supply power to the electrical generator 18 as long as the synchronous machine 13 has a higher frequency than the electrical generator 18. Once their frequencies are matched, the synchronous machine 13 will return to acting as a synchronous motor and the electrical generator 18 will act as a synchronous generator, and the engine 19 will continue to supply power to reach the synchronous speed and will also provide energy to the synchronous machine 13 of the regulated power source 12 to recover the speed and kinetic energy that was lost during the startup of the engine 19. This can occur if either the voltage controller 36 or the automatic voltage regulator 50 is engaged. This is because of the fact that both the synchronous machine 13 of the regulated power source 12 and the electrical generator 18 have squirrel cage windings. Either can act as an induction motor as long as the other is spinning faster, and with excitation, acting as a synchronous generator. However, the simultaneous operation of both the voltage controller 36 and the automatic voltage regulator 50 is carefully coordinated to prevent damaging transient conditions.

Any over-speed of the engine 19 cannot occur by the present invention because the regulated power source 12 is spinning at synchronous speed and frequency (which are equal for both the regulated power source 12 and the electrical generator 18). It cannot supply electrical power or torque to the engine 19 if the electrical generator 18 has higher frequency than the synchronous frequency. The regulated power source 12 also adds inertia in case the speed governor of the engine 19 tends to overshoot. This inertia will reduce the acceleration tending to any overspeed. Therefore, the system is protected against over-speed during startup and operation.

After the engine 19 reaches the nominal synchronous speed of the electrical generator 18, startup of the engine 19 is complete. Electrical generator 18 now supplies power to the synchronous machine 13 of the regulated power source 12. The uninterruptible load 55 receives power from the synchronous generator 31 of the regulated power source 12 before, during and after the mains power supply 20 failure. Power from the synchronous generator 31 is without switching or transients that could negatively affect the quality of such power.

After startup of the engine 19, the engine 19 and the electrical generator 18 can also deliver power to a short-stop load 59 by way of closing external switch 23 to that short-stop load 59. The engine 19 and the electrical generator 18 will continue to operate normally, supplying the power for both the regulated power source 12 and the short-stop load 59. The synchronous machine 13 of the regulated power source 12 will act as a synchronous condenser with high inertia. This provides reactive power to correct power factor and improve voltage and frequency stability to the short-stop load 59.

After the mains power supply 20 is reestablished, a monitoring period confirms that the mains power supply 20 is stable. At this point, the synchronous machine 13 of the regulated power source 12 is disengaged by suspending power supplied by the voltage controller 36 and immediately disconnected by opening the outgoing power switch 54. Then, the incoming power switch 52 will be closed and the voltage controller 36 will resume its operations so that the regulated power source 12 resumes operation powered by the mains power supply 20, and remains ready for any subsequent failure of the mains power supply 20 that may later arise. The operation of engine 19 and electrical generator 18 can now be suspended. Short-stop load 50 can be powered off or it can be connected to the mains power supply 20 by means of the external switch 23 (if the external switch 23 is a two-way transfer switch, not shown) or other switch (not shown). The synchronous generator 31 continues to supply power to the uninterruptible load 55.

The rotating rectifier 48 in the electrical generator 18 can be specially designed to function so that the rotating rectifier 48 will connect both ends of the main rotor winding 46 in short-circuit during cranking operations in order to improve the rising torque produced by the electrical generator 18 (acting as an induction motor) during startup of engine 19.

The method of the present invention is easy to apply since it is applicable to most traditionally commercially available gen-sets. The rotating rectifier 48 will mimic its functionality as in synchronous motors during starting conditions. Although the system of the present invention does not require any traditional method of engine starting, it can be used in addition to any traditional method of engine starting. It can therefore result in a redundant configuration that increases reliability of engine-startup. The electrical generator 18 can also be electromagnetically selected and designed for optimizing the performance of this starting method, by using the previously described rotating rectifier, adding a larger squirrel cage, among other design details that enhance behavior as an induction motor.

FIG. 2 is a cross-sectional view showing the configuration of the electrical generator 18 and the engine 19. As can be seen, the electrical generator 18 has a shaft 60 positioned therein. Shaft 60 can be coupled to the main shaft 62 of the engine 19. Alternatively, the shaft 60 of the electrical generator 18 can be integral with the main shaft 62 of the engine 19. The squirrel cage winding 64 and the main rotor winding 42 are mounted on the shaft 60 so as to rotate with the rotation of the shaft 60. The electrical generator 18 includes the main stator winding 40, the main rotor winding 42 and the squirrel cage winding 64. The electrical generator 18 also includes the excitation stator winding 44 and the excitation rotor winding 46. A rotating rectifier 48 is affixed to the shaft 60 so as to rotate with the rotation of the shaft 60. Similarly, the excitation rotor winding 46, the mains rotor winding 42 and the squirrel cage winding 64 will also rotate with the rotation of the shaft 60.

In FIG. 2, it can be seen that the engine 19 is an internal combustion engine. The electrical generator 18 and the engine 19 can be mounted together so that the shafts 60 and 62 thereof can be easily integrated or coupled.

FIG. 3 shows a cross-sectional view of the regulated power source 12 of the present invention. The regulated power source 12 includes the flywheel 16 and the common shaft 14. The flywheel 16 is mounted to the common shaft 14 that extends upwardly within the housing 15 of the regulated power source 12. All rotating components of the synchronous machine 13 and the synchronous generator 31 are mounted on the common shaft 14. The synchronous machine 13 of the regulated power source 12 has the main stator winding 34, the main rotor winding 32 and the squirrel cage winding 72. The squirrel cage winding 72 is cooperative with the main rotor winding 32, the common shaft 14, and with the main stator winding 34. The main rotor winding 32 and the squirrel cage winding 72 will rotate with the rotation of the common shaft 14. The synchronous machine 13 of the regulated power source 12 further includes the excitation stator winding 28, the excitation rotor winding 30 and rotating rectifier 38. The excitation rotor winding 30, rotating rectifier 38 and the main rotor winding 32 are electrically connected and will rotate with the rotation of the common shaft 14.

In FIG. 3, it can be seen that the common shaft 14 and the housing 15 extend upwardly so as to accommodate the synchronous generator 31. All rotating components of the synchronous machine 13 and the synchronous generator 31 are mounted on to the common shaft 14. The synchronous generator 31 of the regulated power source 12 has a main stator winding 43, a main rotor winding 45 and the squirrel cage winding 47. The squirrel cage winding 47 is cooperative with the main rotor winding 45, the common shaft 14, and the main stator winding 43. The main rotor winding 45 and the squirrel cage winding 47 will rotate with the rotation of the common shaft 14. The synchronous generator 31 of the regulated power source 12 further includes an excitation stator winding 49, an excitation rotor winding 41 and rotating rectifier 39. The excitation rotor winding 41, the rotating rectifier 39 and the main rotor winding 45 are electrically connected and will rotate with the rotation of the common shaft 14. Squirrel cage winding 47 will also rotate the rotation of the common shaft 14.

Figure 4:
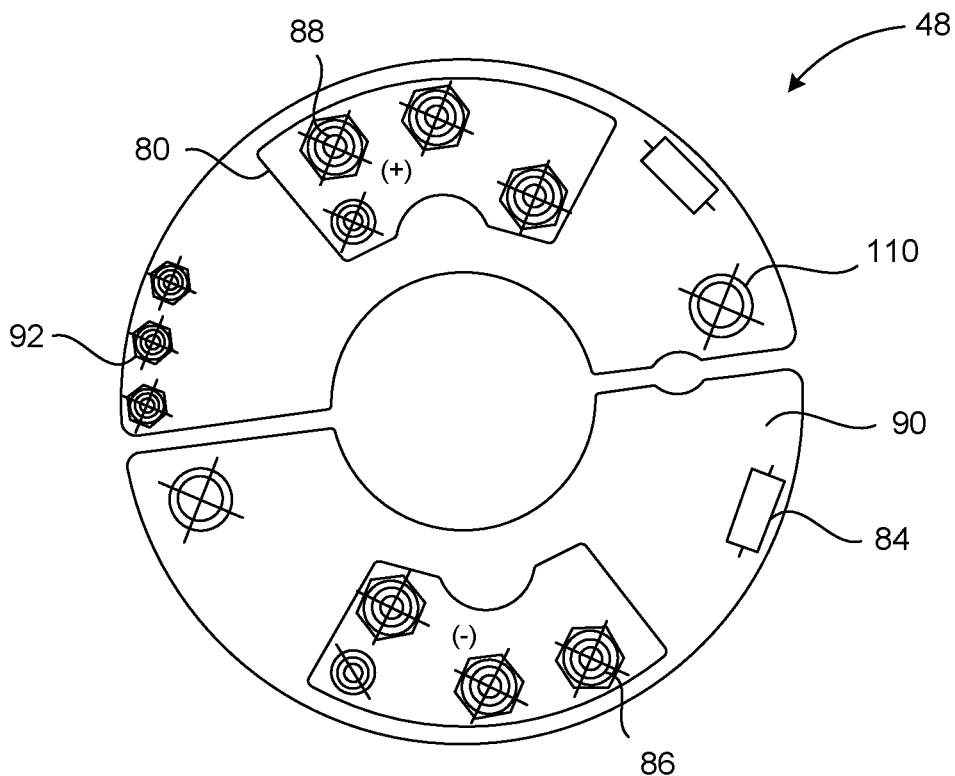
FIG. 4 is a plan view showing the rotating rectifier is used in the present invention.

FIG. 4 illustrates the rotating rectifier 48 as used in the electrical generator 18 of the present invention. The rotating rectifier 48 is a bridge rectifier which it is mounted on a rotor. Neither brushes nor slip rings are used. As such, the rotating rectifier 48 serves to reduce the number of wearing parts. The electrical generator 18 (as with most alternators) has a rotating field and a stationary armature (i.e. power generation windings). By means of the automatic voltage regulator 50 varying the amount of current through the stationary exciter stator windings 44, in turn, varies the three-phase output from the excitation rotor winding 46, which is rectified to direct current in the rotating rectifier 48 to feed the main rotor winding 42. This rotating rectifier 48 has the additional function of placing the terminals of the main rotor winding 42 in short-circuit in order to increase the torque of the electrical generator 18 when it acts as an induction motor during startup of the engine 19. The rotating rectifier 48 opens the short-circuit and resumes normal rectifying functions after start-up of the engine.

Figure 5:
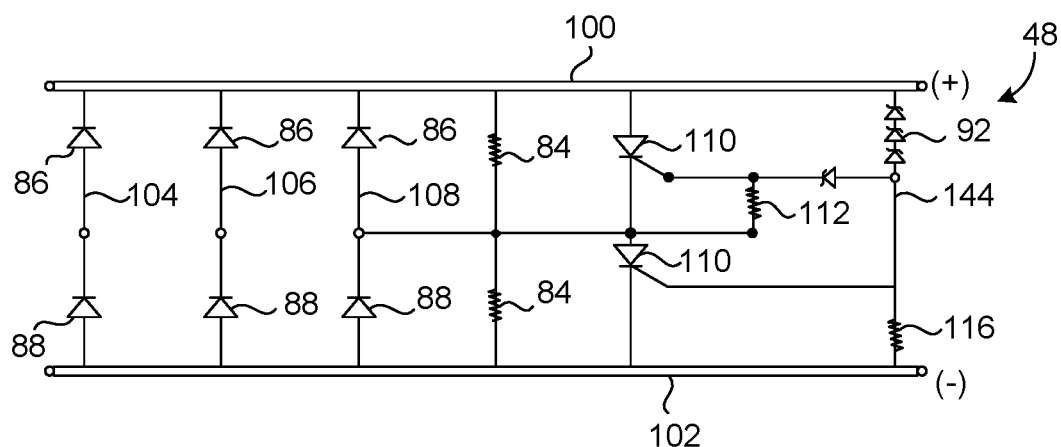
FIG. 5 is electrical schematic of the rotating rectifier is used in the present invention.

The rectifier 48 includes a direct-current (DC) bus 100 and 102 (as shown in FIG. 5), resistors 84, anode diodes 86, and cathode diodes 88. These components are mounted on the rectifier rotor 90 which can be a fixed to the shaft 60 of the electrical generator 18. Zener diodes 92 and silicon-controlled rectifiers or the resistors (SCRs) 110 are also provided on the rectifier rotor 90 to create a short-circuit between the opposing poles of the DC bus 100 and 102, which correspond to the two leads of the main rotor winding 42.

FIG. 5 illustrates the electrical schematic associated with the rotating rectifier 48 of the present invention. In the schematic diagram, there is a positive DC bus 100 and a negative DC bus 102. The center of line 104 is one of the exciter rotor winding 46 terminals that are connected in parallel to both the anode diode 86 on the positive DC bus 100 and the cathode diode 88 on the negative DC bus 102. Line 106 and line 108 connect in a similar fashion as line 104. Resistors 84 are placed on the line extending between the positive DC bus 100 and negative DC bus 102. The SCR 110 controls the flow of electricity across the DC bus between the positive DC bus 100 and the negative DC bus 102 in short-circuit during startup of engine 19. This also places the leads of the main rotor winding 42 in short-circuit. SCRs 110 are activated by line 144 which includes the Zener diode 92 along with resistors 112 and 116.

After the end of the engine startup operation described hereinabove and after the engine 19 reaches the nominal synchronous speed of the electrical generator 18, the regulated power source 12 will remain connected to the electrical generator 18. As such, the electrical generator 18 can work either as an induction generator or as a synchronous generator, depending on which excitation system is designated in order to operate in constant running engine conditions. The synchronous machine 13 of the regulated power source 12 will receive power produced by the engine 19 in order to recover velocity and return to synchronous speed of the regulated power source 12. The synchronous generator 31 of the regulated power source 12 will continue to supply uninterruptible power to the uninterruptible load 55 without the need for any switching to occur on the output of the synchronous generator 31.

In the present invention, the regulated power source 12 includes the synchronous machine 13, the synchronous generator 31, the housing 15, the common shaft 14, and the flywheel 16. The synchronous generator 31 cooperates with the rotating components that cooperate with the common shaft 14 and with the flywheel 16 of the regulated power source 12. The synchronous machine 13 and the synchronous generator 31 each have their own independent source of excitation (and the corresponding voltage controller and the voltage regulator 50, excitation windings and rotating rectifiers). The synchronous generator 31 can supply uninterruptible power to the uninterruptible load 55 without the need for any switching to occur on the output of the synchronous generator 31. The synchronous generator 31 is electrically independent and isolated from the rest of the electrical circuits in the power supply system.

In normal operating conditions, the uninterruptible load 55 receives power from the synchronous generator 31 of the regulated power source 12 (whose common shaft 14 is powered by the synchronous machine 13), which, in turn, is powered by the mains power supply 20. If any failure occurs in the mains power supply 20, before engine 19 is started and up to full speed of engine 19, the synchronous generator 31 continues to deliver power to the uninterruptible load 55 because the common shaft 14 continues to rotate because of the inertia in the flywheel 16. When start-up of the engine is achieved through the aforementioned method, the engine 19 delivers power to the synchronous machine 13 of the regulated power source 12, which, in turn, continues to deliver power to in an uninterruptible fashion to the uninterruptible load 55 via the synchronous generator 31 of the regulated power source 12. After the mains power supply 20 is reestablished and deemed safe, the synchronous machine 13 of the regulated power source 12 is disengaged by opening the outgoing power switch 54. Then, the incoming power switch 52 will be closed and the voltage controller 36 will resume its operations so that the regulated power source 12 resumes operation powered by the mains power supply 20, and remains ready for any subsequent failure of the mains power supply 20. Engine 19 and electrical generator 18 can now suspend operation. During all these operations, the regulated power source 12 continues to spin at synchronous or near-synchronous speed and the synchronous generator 31 continues to supply power to the uninterruptible load 55 without harmful switching or fast-acting electrical transients on the supply to the uninterruptible load 55. The mechanical energy in the common shaft 14 of the regulated power supply 12 would be maintained by the synchronous machine 13 and the flywheel 16. These are electrically isolated from the electric components of the synchronous generator 31.

To facilitate commissioning, the rotating rectifier 38 of the synchronous machine 13 has the same functionality as the rotating rectifier 48 of the electrical generator 18. During commissioning the regulated power source 12 must be accelerated from a stand-still. In order to achieve this, the synchronous machine is used as an induction motor thanks to its squirrel cage and the rotating rectifier 38 placing the leads of the main rotor winding 32 in short circuit to increase the torque of the synchronous machine during commissioning. Therefore, FIG. 4 and FIG. 5 also describe the rotating rectifier 38 of the synchronous machine 13 of the regulated power source 12. An additional (not shown) centrifugal switch or radio-controlled switch may be added to the rotating rectifier 38 if a reduced-voltage motor-start method is used.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A power supply system comprising:
   a regulated power source having a housing, a synchronous machine, a synchronous generator, and a flywheel sharing a common shaft in the housing; said synchronous machine comprising:
   an excitation stator winding;
   an excitation rotor winding cooperative with said excitation stator winding, said excitation rotor winding rotating with a rotation of the common shaft of said regulated power source;
   a main stator winding;
   a main rotor winding cooperative with said main stator winding, said main rotor winding affixed to said common shaft and rotatable with the rotation of the common shaft of said regulated power source; and
   a squirrel cage winding cooperative with said main stator winding and said main rotor winding, said squirrel cage winding being rotatable with the rotation of the common shaft of said regulated power source;
   an electrical generator having a shaft therein;
   an engine having a main shaft integral with or coupled to said shaft of said electrical generator;
   a mains power supply;
   a switch cooperative with said electrical generator and said mains power supply and the synchronous machine of said regulated power source, said switch selectively making an electrical connection between said synchronous machine and said mains power supply, said switch adapted to transfer electric power from the synchronous machine of said regulated power source to said electrical generator so as to cause said electrical generator to rotate the shaft thereof in order to rotate the main shaft of said engine during startup of said engine; and an electrical load, the synchronous generator of said regulated power source supplying electrical power to said electrical load.

2. The power supply system of claim 1, the synchronous machine driving the common shaft of said regulated power source, said regulated power source having a power line, the power line being connected to said switch.

3. The power supply system of claim 1, said regulated power source further comprising:
   a voltage controller electrically connected to said excitation stator winding of said synchronous machine so as to cause a voltage to develop in said main stator winding.

4. The power supply system of claim 1, further comprising:
   a rotating rectifier affixed to the common shaft and electrically connected to said excitation rotor winding and said main rotor winding of the synchronous machine of said regulated power source.

5. The power supply system of claim 1, said regulated power source being switchable by said switch so as to be electrically connected to the mains power supply so as to supply power from said mains power supply to said regulated power source.

6. The power supply system of claim 1, said engine being an internal combustion engine.

7. The power supply system of claim 1, said mains power supply being a three-phase AC power supply.

* * * * *